United States Patent [19]

Kurtz et al.

[11] Patent Number: 5,428,985
[45] Date of Patent: Jul. 4, 1995

[54] GAS LEAK DETECTION APPARATUS AND METHODS

[75] Inventors: Anthony D. Kurtz, Teaneck; Wolf Landmann, Fairlawn, both of N.J.

[73] Assignee: Kulite Semiconductor Products, Inc., Leonia, N.J.

[21] Appl. No.: 191,514

[22] Filed: Feb. 3, 1994

[51] Int. Cl.⁶ .................. G01M 3/25; G01N 27/04
[52] U.S. Cl. .................. 73/25.01; 73/23.27; 73/31.04
[58] Field of Search .......... 73/25.01, 23.27, 30.02, 73/31.04, 31.05, 25.01

[56] References Cited

U.S. PATENT DOCUMENTS

| | | | |
|---|---|---|---|
| 3,527,085 | 9/1970 | Silas et al. | 73/29.03 |
| 3,753,369 | 8/1973 | Fowler, et al. | 73/25.01 |
| 4,129,030 | 12/1978 | Dolan | 73/23 |
| 4,443,793 | 4/1984 | Hall, Jr. | 340/634 |
| 4,447,780 | 5/1984 | Youmans et al. | 324/132 |
| 4,631,952 | 12/1986 | Donaghey | 73/23 |
| 4,766,763 | 8/1988 | Kurtz et al. | 73/49.2 |
| 4,924,701 | 5/1990 | Delatorre | 73/151 |
| 5,086,644 | 2/1992 | Schendel | 73/49.2 |

FOREIGN PATENT DOCUMENTS

| | | | |
|---|---|---|---|
| 0236991 | 6/1986 | Germany | 73/23.27 |
| 4216937 | 11/1993 | Germany | 73/49.2 |

Primary Examiner—Hezron E. Williams
Assistant Examiner—J. David Wiggins
Attorney, Agent, or Firm—Plevy & Associates

[57] ABSTRACT

An improved gas leak detection apparatus is disclosed for detecting a leak in a gas containing vessel of constant volume which compensates for deviations in behavior of a contained gas from an ideal model. The apparatus incorporates a pressure transducer, an amplifying means and a feedback means and operates to effectively and accurately model the van der Waals equation of state for gasses. The apparatus is adaptable for operation with any number of different gases by simply changing the values of specific circuit elements. The output of the apparatus is proportional to the total number of moles of gas present in the containment vessel at any particular time, and will thus indicate a leak from the vessel upon a reduction in that number of moles, absent an intentional reduction of the mass of gas in the vessel.

20 Claims, 4 Drawing Sheets

GAS LEAK DETECTION APPARATUS AND METHODS

FIELD OF THE INVENTION

This invention relates to a gas leak detector apparatus and more particularly to a technique and apparatus for detecting gas leaks utilizing pressure transducers and electrical circuitry.

BACKGROUND OF THE INVENTION

There are many situations where it is necessary to determine whether a leak exists in a gas filled container of fixed volume. One example of such a situation is a manufacturing operation where it is necessary to determine and control the concentration of combustible gases in a vessel. A leak makes it difficult for a manufacturer to maintain optimum concentrations of the gas for combustion and other chemical reactions where such gases may be used. A leak of combustible gases, most of which are toxic, also presents a safety hazard to operating personnel who may inhale the vapors or be subject to an explosion. Therefore, it is very important that a reliable method of detecting such leaks be found. The chosen method should provide one with an accurate representation of the magnitude of the leak so that suitable alarms or warnings can be given or so that the quantity of gas remaining in the vessel—usually expressed as the number of moles—may be ascertained. As is well known, a mole equals $6 \times 10^{23}$ molecules of any substance.

The prior art is replete with a number of gas analyzers which all serve to monitor the concentration of gases. These devices can, of course, be used to determine whether or not a vessel containing a gas is experiencing a leak because they indicate the number of moles of gas that are contained in the vessel at any time. If the reading given by the device indicates a lower concentration of gas than is expected at any particular time, a leak must exist.

A very common gas analyzer device employs a self-heated hot wire detector which is usually made of platinum. When the combustible gas to be measured contains oxygen, the mixture is fed to the hot wire detector where combustion occurs; the wire serving as a combustion catalyst. A temperature sensor, such as a thermocouple, then measures the temperature rise resulting from the combustion and this measurement is directly related to the concentration of the gas. More frequently, the electrical resistance of the hot wire itself is measured as the means for detecting temperature rise, much as occurs in a typical electrical resistance thermometer. When the sample to be measured does not contain oxygen, air or oxygen must be added to the sample in carefully controlled quantities, but well in excess of combustion requirements, so that the reaction occurring within the detector will be limited only by the amount of combustible gases or vapors present. Wheatstone bridge circuitry is generally used in these instruments, in which case a reference detector is also required.

In another type of gas analyzer, the sample gas is burned in a small pilot flame where the temperature is monitored by a thermocouple. The presence of combustibles in the supply of gas to the pilot causes the flame temperature to increase proportionately with concentration. There are also gas analyzers of the thermal conductivity type which operate on the principle that different gases vary considerably in their ability to conduct heat. Such devices use hot wire gas analyzer cells, a typical cell being comprised of an electrically conductive elongated sensing element that is mounted coaxially inside a cylindrical chamber which contains the gas to be measured. By passage of an electrical current through the element, the cell is maintained at a temperature considerably higher than the cell wall. The equilibrium temperature is reached when all thermal losses from the element have stabilized. The difference of temperature between the element and the cell walls, as displayed by the temperature rise of the element at equilibrium, is a function of the electric power input and the combined rate of heat loss from the wire by gaseous conduction, convection, radiation and conduction through the solid parts of the element. Proper cell design and geometry makes it possible to maximize the heat loss due to gaseous conduction. Thus, a rise in the temperature of the element at constant electric power input is inversely related to the thermal conductivity of the gas within the cell. Normally, a Wheatstone bridge is used to measure resistance change of the sensing element.

As can be seen, these prior-art devices for monitoring the concentration of gases in a vessel are generally cumbersome and difficult to monitor and use. A major improvement over those prior-art devices is a gas leak detector apparatus which is disclosed in U.S. Pat. No. 4,766,763 entitled GAS LEAK DETECTION APPARATUS AND METHODS issued to A. D. Kurtz on Aug. 30, 1988, and assigned to the same assignee as the present invention. That apparatus utilizes a pressure transducer, which produces an output voltage proportional to the gas pressure inside a containment vessel, and an amplifier circuit with a gain proportional to the reciprocal of the absolute temperature of the gas inside the vessel, to produce an output signal which indicates whether the vessel has a leak. The apparatus operates on the principle of the ideal gas law which states that, at normal temperatures and pressures, the pressure of a gas is given by the equation $PV=nRT$, where V is the volume occupied by the gas, P is the pressure of the gas, R is the universal gas constant, n is the number of moles of gas within the volume, and T is the absolute temperature of the gas. The output of the apparatus is proportional to the ratio of pressure to temperature, P/T, and, accordingly, is independent of temperature induced pressure changes. Therefore, for a fixed volume vessel, any change in the value of the output signal will be indicative of a change in the number of moles of gas contained in the vessel and thereby connote a leak. The apparatus uses a pressure transducer having a deflectable diaphragm operating in conjunction one or more pressure responsive resistors which typically will be disposed as part of a Wheatstone bridge array. An output signal from this transducer, which will be proportional to the pressure in the vessel, is then fed into an operational amplifier circuit which utilizes a temperature sensitive resistance to effect an overall circuit gain proportional to 1/T. The output of the combination of these two elements is therefore proportional to P/T.

While this device offers significant advantages over the leak detection devices that preceded it, there remains an inherent element of inaccuracy due to the fact that the ideal gas law is not a highly accurate model for the behavior of real gases. In general, real gases fail to behave in an ideal manner for two reasons. First, because all molecules are of finite dimensions, the presence of a molecule in a certain location in any given volume prevents another molecule from occupying the same space. This tends to make the volume occupied by the gas larger than that calculated using the ideal gas law. Second, there is always a slight attraction between the molecules of a gas, and this prevents the particles from moving independently of one another. This tends to make the volume occupied by the gas smaller than that calculated using the ideal gas law. While these opposing errors will tend to cancel one another, an exact cancellation seldom occurs. In general, gases with higher boiling points display larger deviations from ideal behavior, with the largest deviations occurring when the gas is approaching condensation.

Because of the deviation between the behavior of real gases and the behavior predicted by the ideal gas law, many equations have been developed which attempt to take into account the characteristics of each particular gas in predicting how that gas will behave. One of the most useful of these equations is the van der Waals equation:

$$\left(P + \frac{n^2 a}{V^2}\right)(V - nb) = nRT$$

where P is the pressure, V is the volume, R is the universal gas constant, T is the absolute temperature, n is the number of moles of gas, and a and b are constants which are characteristic of each gas. The constant "a" concerns the energy of attraction between the molecules of the gas and the constant "b" concerns the physical space taken up by the molecules of the gas. These constants are usually found by experiment. Once these constants are found, the van der Waals equation offers a much more accurate model of the behavior of real gases than does the ideal gas law.

SUMMARY OF THE INVENTION

It is an object of this invention to provide an improved gas leak detection apparatus operating upon the principle of the van der Waals equation and thereby to more accurately determine the number of moles of a gas in a vessel of constant volume, from which an accurate determination may be made as to whether a leak exists in such a vessel. Accordingly, an apparatus is disclosed for detecting a leak in a closed gas containing vessel of a given volume, comprising: (1) a pressure transducer, having a member operable to change from a first position to a second position in response to a change in pressure of a gas applied to a surface thereof, and being disposed relative to the vessel so as to place that surface in contact with a gas contained in the vessel, and further having a means for converting those position changes into an electrical signal proportional to the magnitude of the position changes; (2) amplifying means operating on that electrical signal so as to produce, at an output thereof, an output signal characterized in being inversely proportional to changes in temperature of the gas, thereby causing the output signal to be independent of temperature induced changes in pressure for the gas; and (3) means for compensating the output signal for deviations from a perfect model in such gas pressure changes, thereby providing at the output a signal directly proportional to actual temperature-independent pressure changes, the actual pressure changes being indicative of a reduction in mass of the gas and thereby indicative of a leak from a sealed vessel.

DETAILED DESCRIPTION OF THE DRAWINGS

The invention is an improvement over the apparatus disclosed in U.S. Pat. No. 4,766,763 for detecting a leak in a gas containing vessel of constant volume. Unlike the referenced apparatus, which determines changes in the quantity of gas in a vessel in accordance with the principle of the ideal gas law, and thereby incorporates the error inherent in that principle, the improved apparatus of the invention operates on the principle of the van der Waals equation of state, and provides an output indicative of the number of moles of a gas in the vessel under real world conditions. As described more fully below, the apparatus of the invention makes use of a linear pressure transducer, a temperature sensitive amplifier section, and a temperature sensitive feedback amplifier section to effect the nonlinear circuit characteristics necessary to accurately correspond with the parameters of the van der Waals equation. The output of the circuit will therefore represent a solution of the equation for the variable "n", which represents the number of moles of gas present in the vessel at any particular time.

For convenience the van der Waals equation is herein restated:

$$\left(P + \frac{n^2 a}{V^2}\right)(V - nb) = nRT$$

where,
P = pressure in the vessel,
V = volume of the vessel,
n = number of moles of gas in the vessel,
a and b = constants characteristic of the particular gas in the vessel,
R = universal gas constant, and
T = absolute temperature.

This equation can also be stated as:

$$n^3 \left(\frac{ab}{V^2}\right) - n^2 \left(\frac{a}{V}\right) + n(Pb + RT) - PV = 0$$

In this form it can readily be seen that the van der Waals equation is a third order equation in "n", hence that an apparatus implemented to carry out the solution of such an equation must itself be capable of carrying out such a nonlinear function.

Figure 1:
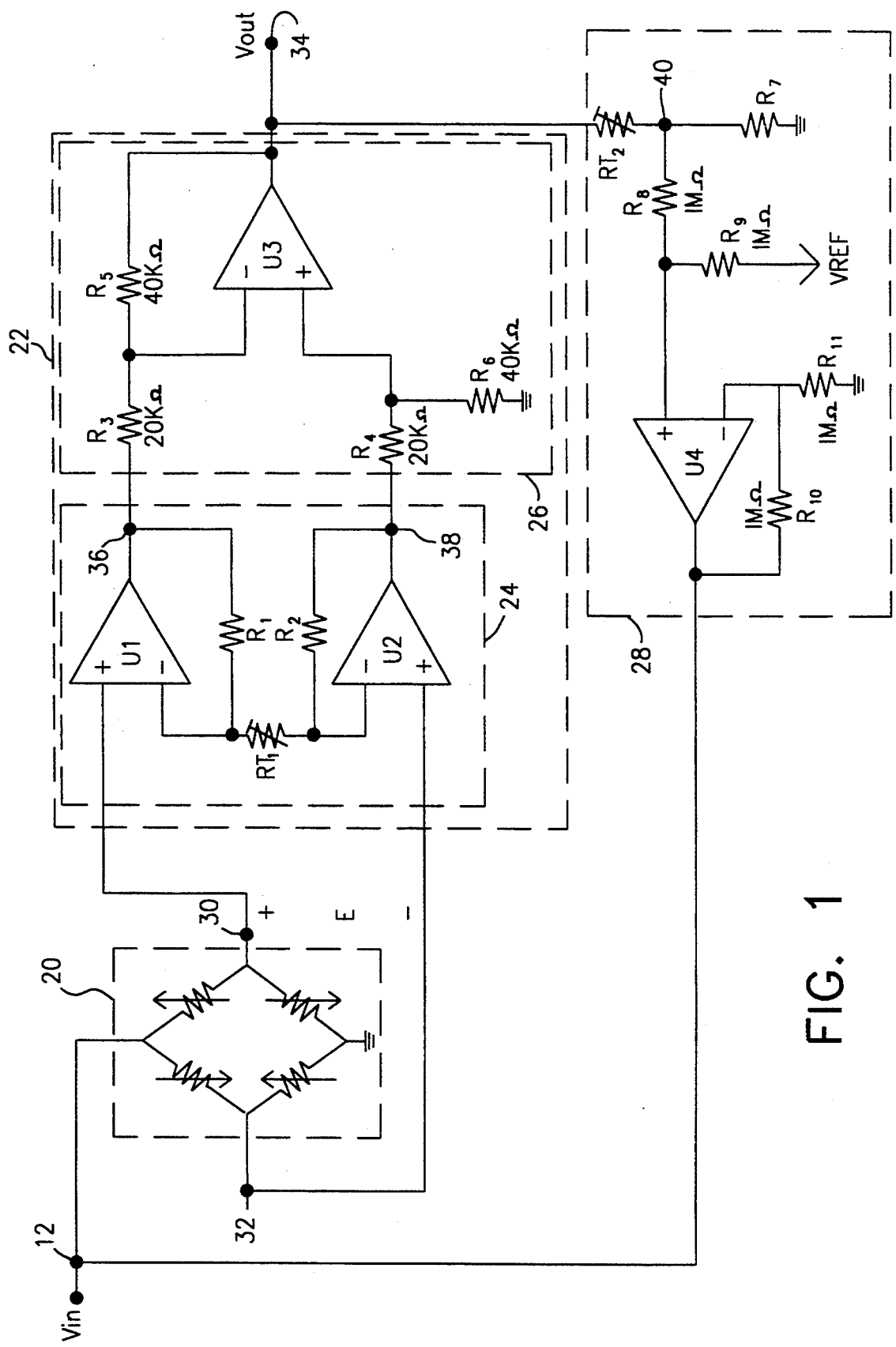
FIG. 1 is a schematic diagram of the apparatus of the invention.

Considering initially the overall structure and operation of the apparatus of the invention, as depicted schematically in FIG. 1, Pressure Transducer 20 will be positioned so as to cause a diaphragm associated therewith to be in contact with a gas housed within a containment vessel and will be affixed to the vessel in such a manner as to preclude any escape of the gas at the interface between the pressure transducer and the vessel. Changes in pressure of the gas housed within the vessel will thereupon act against the diaphragm to cause displacement thereof, which displacement is translated by the Pressure Transducer into a differential voltage signal E, across output terminals 30 and 32.

This differential voltage signal, which, as indicated, is a function of the gas pressure in the vessel, is fed into Amplifier Section 22. The Amplifier Section amplifies this differential voltage signal and produces single ended output voltage signal $V_{OUT}$ at output terminal 34. A portion of $V_{OUT}$ is then fed back to the input terminal 12 of the Pressure Transducer through Feedback Section 28, which operates to amplify the feedback signal to a desired level. As will be shown, both the amplifier section and the feedback section are responsive to the temperature changes inside the gas-containing vessel.

In the described embodiment, the pressure transducer utilizes piezoresistive elements in a Wheatstone bridge configuration. The piezoresistive elements, which will be arranged so as to be acted upon by displacement of the Pressure Transducer diaphragm, are thereby responsive to the pressure of the gas contained in the vessel. The output voltage signal E of the Pressure Transducer will therefore be a function of pressure. The piezoresistive elements may have nominal resistance values of 1 k$\Omega$ with pressure coefficients of 2% output at 100 bar.

As can be seen in FIG. 1, Amplifier Section 22 is delineated into Differential Amplifier 24 and Differential-To-Single-Ended Converter 26. The Differential Amplifier includes Operational Amplifiers $U_1$ and $U_2$, Feedback Resistors $R_1$ and $R_2$, and Temperature Dependent Resistor $R_{T1}$. The non-inverting input terminals of $U_1$ and $U_2$ (designed as "+") are connected to output terminals 30 and 32 of the Pressure Transducer, respectively. The inverting inputs of $U_1$ and $U_2$ (designated "−") are connected together through Temperature Dependent Resistor $R_{T1}$. Feedback Resistor $R_1$ is connected from output terminal 36 of $U_1$ to the inverting input terminal of that device. Similarly, feedback resistor $R_2$ is connected from output terminal 38 of $U_2$ to the inverting input terminal of that device. As can be seen, the differential output signal of the Differential Amplifier will be across terminals 36 and 38. In the described embodiment of the invention, circuit elements are chosen so that the gain of the differential amplifier will be approximately 25 at 25° C., and the temperature coefficient of $R_{T1}$ will be approximately 0.44% per °C.

The Differential-To-Single-Ended Converter includes Operational Amplifier $U_3$ and fixed resistors $R_3$, $R_4$, $R_5$, and $R_6$. Resistor $R_3$ is connected from output terminal 36 of $U_1$ to the inverting input terminal of $U_3$. Similarly, resistor $R_4$ is connected from output terminal 38 of $U_2$ to the non-inverting input terminal of $U_3$. Resistor $R_5$ is connected from output terminal 34 of $U_3$ to the inverting input terminal of that device. Resistor $R_6$ is connected from the non-inverting input terminal of $U_3$ to ground.

Feedback Section 28 includes Operational Amplifier $U_4$, fixed resistors $R_7$, $R_8$, $R_9$, $R_{10}$, and $R_{11}$, and Temperature Dependent Resistor $R_{T2}$. As shown, Temperature Dependent Resistor $R_{T2}$ is connected between output terminal 34 and node 40 of the Feedback Section. Resistor $R_7$ is connected between node 40 and ground, thus forming, with $R_{T2}$, a voltage divider whereby the feedback signal varies in proportion to changes in the value of Temperature Dependent Resistor $R_{T2}$. Resistor $R_8$ is connected between node 40 and the non-inverting input terminal of $U_4$. Resistor $R_9$ is connected from the non-inverting input terminal of $U_4$ to a regulated voltage source $V_{ref}$. Resistor $R_{10}$ is connected from the inverting input terminal of $U_4$ to the output terminal of that device. Resistor $R_{11}$ is connected from the inverting input terminal of $U_4$ to ground. The output terminal of $U_4$ is connected to input terminal 12 of the Pressure Transducer. As noted, resistors $R_{T2}$ and $R_7$ form a voltage divider which determines the amount of output voltage signal $V_{OUT}$ that will be fed back through the Feedback Amplifier. In the described embodiment of the invention, the ratio of $R_{T2}$ to $R_7$ will be approximately 1:4 at 25° C. Also in the described embodiment, the value of resistors $R_8$, $R_9$, $R_{10}$, and $R_{11}$ will be 1 M$\Omega$, the value of $V_{ref}$ approximately 5.85 volts, and the temperature coefficient of $R_{T2}$ will be approximately 0.198% per °C.

Figure 2:
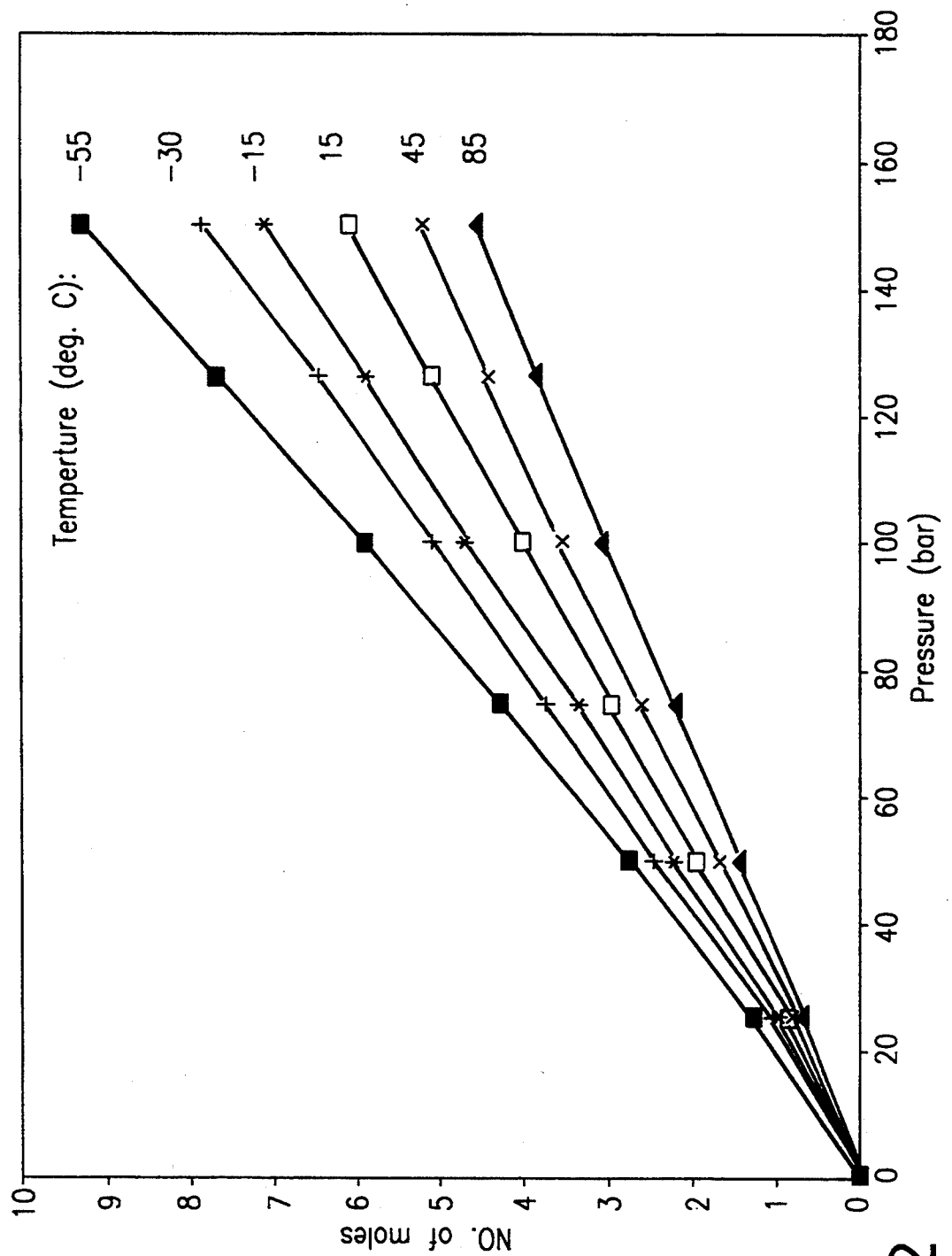
FIG. 2 depicts a set of curves showing moles of gas vs. pressure at various temperatures for oxygen as determined by the van der Waals equation.

As respects the interrelationship between the van der Waals resultant and the output of the apparatus of the invention, it will be known that the van der Waals equation can be solved analytically or numerically. By plotting the solution of this equation as n (number of moles) versus the pressure P, with the temperature T as a parameter, a family of non-linear curves is obtained. A typical set of such curves, for oxygen at a certain volume, is shown in FIG. 2.

On the other hand, the circuitry which comprises the apparatus of the invention, as shown in FIG. 1, has an output voltage $V_{OUT}$ (in volts) which is a function of pressure P and temperature T, the functional relationships being described by the following set of equations:

$$V_{TR\cdot OUT} = k_{TR} \cdot V_{IN} \cdot P$$

$$V_{OUT} = \frac{R5}{R3} \cdot \left(1 + \frac{R1 + R2}{RT1}\right) \cdot V_{TR\cdot OUT}$$

$$V_{IN} = V_{REF} + \frac{R7}{R7 + RT2} \cdot V_{OUT}$$

$$RT1 = RT1_0 \cdot [1 + \alpha_1 \cdot (T - T_0)]$$

$$RT2 = RT2_0 \cdot [1 + \alpha_2 \cdot (T - T_0)]$$

The variables in this set of equations are:

$V_{TR\cdot OUT}$ = output voltage from the Pressure Transducer 20

$V_{IN}$ = input (supply) voltage to the Pressure Transducer $k_{TR}$ = Pressure Transducer scale factor (%/psi)

$\alpha_1$, $\alpha_2$ = temperature coefficients of RT1, RT2 respectively $T_0$ = reference temperature, usually 25° C. (298.15° K.)

$RT1_0$, $RT2_0$ = resistance value of RT1 or RT2 respectively at the reference temperature $T_0$ $V_{REF}$ = reference (stable) voltage.

A set of values is chosen for certain of the circuit elements based on known design criteria and for an exemplary embodiment of the invention, the following such values are used:

R1=R2=30 kΩ
R3=R4=20 kΩ
R5=R6=40 kΩ

With these predetermined circuit values, the system of simultaneous equations above may be reduced to:

$$V_{OUT} = \frac{2 \cdot \left(1 + \frac{60}{RT1}\right) \cdot k_{TR} \cdot P \cdot V_{REF}}{1 - 2 \cdot \left(1 + \frac{60}{RT1}\right) \cdot k_{TR} \cdot P \cdot \frac{R7}{R7 + RT2}}$$

As will be apparent, this system of equations, even in its reduced form, is analytically very different from the van der Waals equation. However, through the use a set of carefully chosen parameters, the electrical output of the circuit of the invention, as represented by the reduced equation above, matches with a good approximation the solution of the van der Waals equation. These parameters are:

$RT1_0$, $RT2_0$, $\alpha_1$, $\alpha_2$, R7 AND $V_{REF}$

The similarity between the solution of the van der Waals equation and the reduced equation above for $V_{OUT}$ may be qualitatively shown through an iterative process beginning with a presumption that R7 is much smaller than RT2, and therefore that the second term of the denominator of the $V_{OUT}$ equation is smaller than 1. By neglecting this term, the output voltage $V_{OUT}$ can be approximated then by the numerator only, thus being a relatively linear function of the pressure P, with a proportionality coefficient decreasing with temperature, due to the term RT1. By next accounting for the contribution of the second term of the denominator, it will be seen that a non-linear response similar to the solution of the van der Waals equation occurs. This non-linear factor is also temperature dependent and its contribution is adjusted by properly selecting R7, $RT2_0$ and $\alpha_2$.

Those circuit values are chosen according to the following procedure. For a certain gas, e.g. oxygen, the van der Waals equation is solved numerically as n (number of moles) versus pressure P, for different temperatures T. Then the set of equations which describes the circuit is solved, also numerically, yielding $V_{OUT}$ as a function of P and T. This solution is found for a particular Pressure Transducer with a known $k_{TR}$, a set of predetermined values for R1, R2, R3, R4, R5, R6, and a set of arbitrarily chosen parameters $RT1_0$ $RT2_0$ $\alpha_1$, $\alpha_2$, R7 and $V_{REF}$. These arbitrarily determined parameters are then recursively adjusted until an optimal fit between the solution of the van der Waals equation and $V_{OUT}$ is found. For a different gas, the procedure is repeated, using the appropriate values of "a" and "b".

By following this procedure, the matching between $V_{OUT}$ and the number of moles n, short of a coefficient of proportionality, is better than ±3% for oxygen and other gases. From an implementation point of view, the parameters $RT1_0$, $RT2_0$, $\alpha_1$, $\alpha_2$, R7 and $V_{REF}$ are adjusted by selecting a set of very stable resistors and "posistors", i.e., resistors with a well defined temperature coefficient of resistance, usually around 0.7%/°C. The adjustment of the parameters $\alpha_1$, and $\alpha_2$ is then accomplished by using combinations of fixed resistors and posistors for RT1 and RT2. The adjustment of $V_{REF}$ is done by generating it from a well regulated stable voltage, through a voltage divider made of two resistors, one fixed and the second one selected at test.

As already noted, the circuit values depicted in the described embodiment of the invention will be those required to implement the van der Waals constants "a" and "b" for oxygen, and thus the values which would be used in the apparatus of the invention for the detection of a leak in a vessel filled with oxygen. As will however be apparent to those skilled in the art, the apparatus of the invention may be implemented for other gases by simply changing the values of the circuit elements to account for the different values of the constants a and b.

In considering the operation of the apparatus of the invention, it is useful to first consider the circuit of FIG. 1 without the feedback circuit—i.e., constant input voltage to the bridge array. Under this constraint, it can be seen that the output of the circuit would be proportional to the mass of the gas in a container, as predicted by the perfect gas equation. Solving the perfect gas equation for mass, or number of moles, n, yields:

$$n = \left(\frac{V}{R}\right)\left(\frac{P}{T}\right)$$

For a given container, the "V/R" term will be a constant, so that the only variables, in the perfect gas hypothesis, will be "P" and "T". As with the referenced "perfect gas" leak detection invention, the apparatus of the present invention utilizes the known proportionality between gain of an operational amplifier and the ratio of feedback resistance to input resistance for such an amplifier (here $R_1$ or $R_2$ over $\frac{1}{2}$ $R_{T1}$, as related to operational amplifiers $U_1$ or $U_2$) to provide a gain proportional to the "1/T" factor, and thereby eliminate the effect of temperature induced changes in pressure from the output of the circuit.

In the present invention, the neutralization of the 1/T factor results from the temperature dependence of $R_{T1}$ and an appropriate choice of feedback resistance to achieve the desired gain from operational amplifiers $U_1$ and $U_2$. The temperature dependence of $R_{T1}$ follows the relationship:

$$R_{T1} = R_{T10}(1 + \alpha_T \Delta T)$$

where
$R_{T10}$ is the sensor resistance at $T = T_0$
$T_0$ is the absolute reference temperature ($T_0 = 600°$ F. at room ambient)
$\Delta T = T - T_0$, i.e., any change from $T_0$
$\alpha_T$ is the temperature coefficient, TCR, of the temperature sensing resistance.

When the feedback circuit is added to the apparatus of the invention, the supply voltage to the bridge array will be increased directly proportional to changes in pressure and inversely proportional to temperature changes. As will be seen from the circuit diagram of FIG. 1, that inverse proportionality for the feedback circuit respecting temperature change results from the temperature dependence of $R_{T2}$, which performs a voltage division circuit with R7. The resistance of $R_{T2}$ will vary with temperature in the same manner as described above for temperature dependent resistance $R_{T1}$. With this feedback loop, the output voltage, $V_{OUT}$, of the apparatus of the invention will very closely track the van der Waals curve for a particular gas. In the described embodiment, the invention models the van der Waals curve for oxygen. To model the van der Waals curves for other gases, the differential gain, $V_{ref}$, the $R_{T2}/R_7$ voltage division ratio, and the temperature coefficients of $R_{T1}$ and $R_{T2}$ will be appropriately adjusted.

Figure 3:
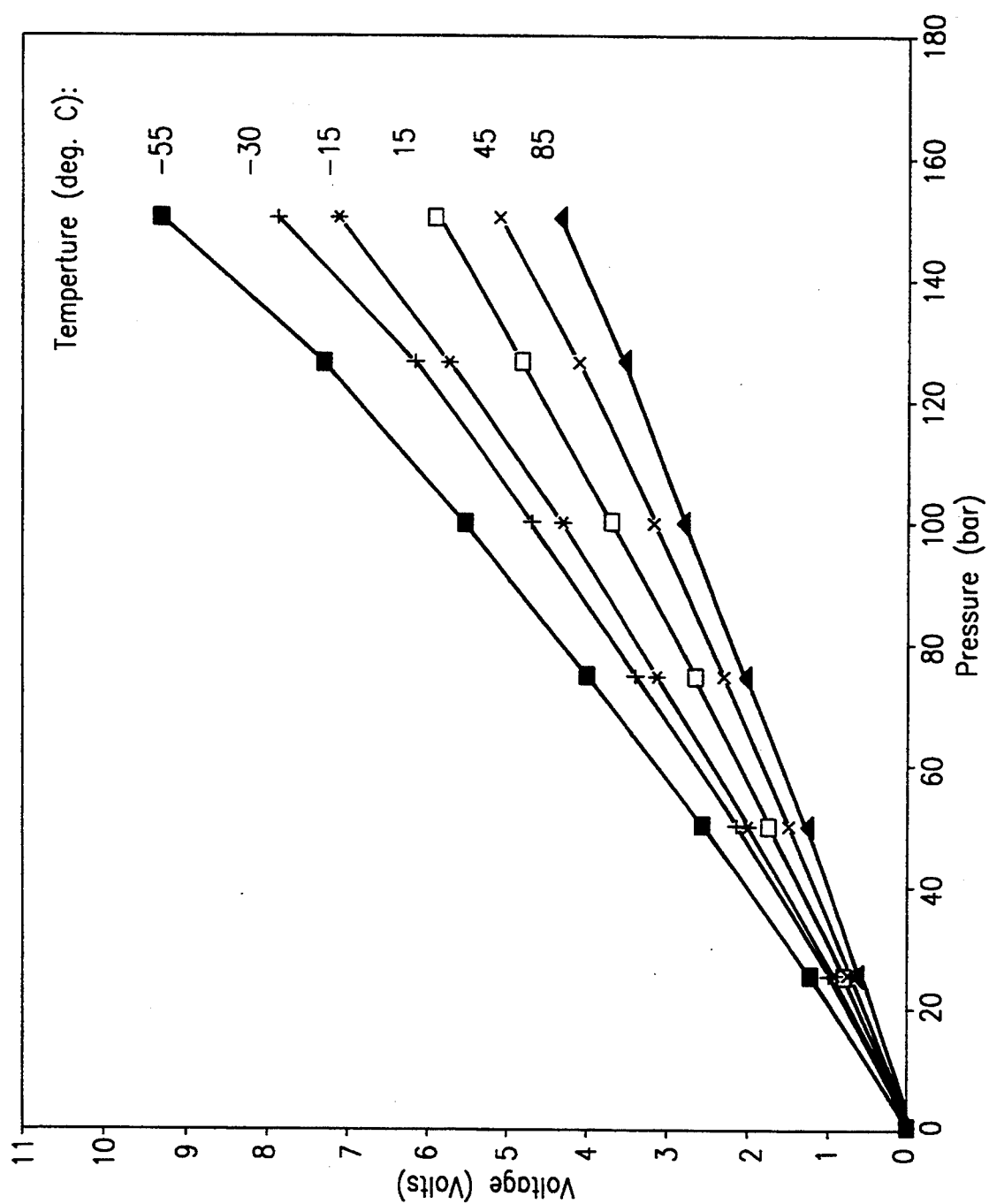
FIG. 3 depicts a set of curves showing voltage output of the apparatus of the invention versus pressure at corresponding temperatures for oxygen.
Figure 4:
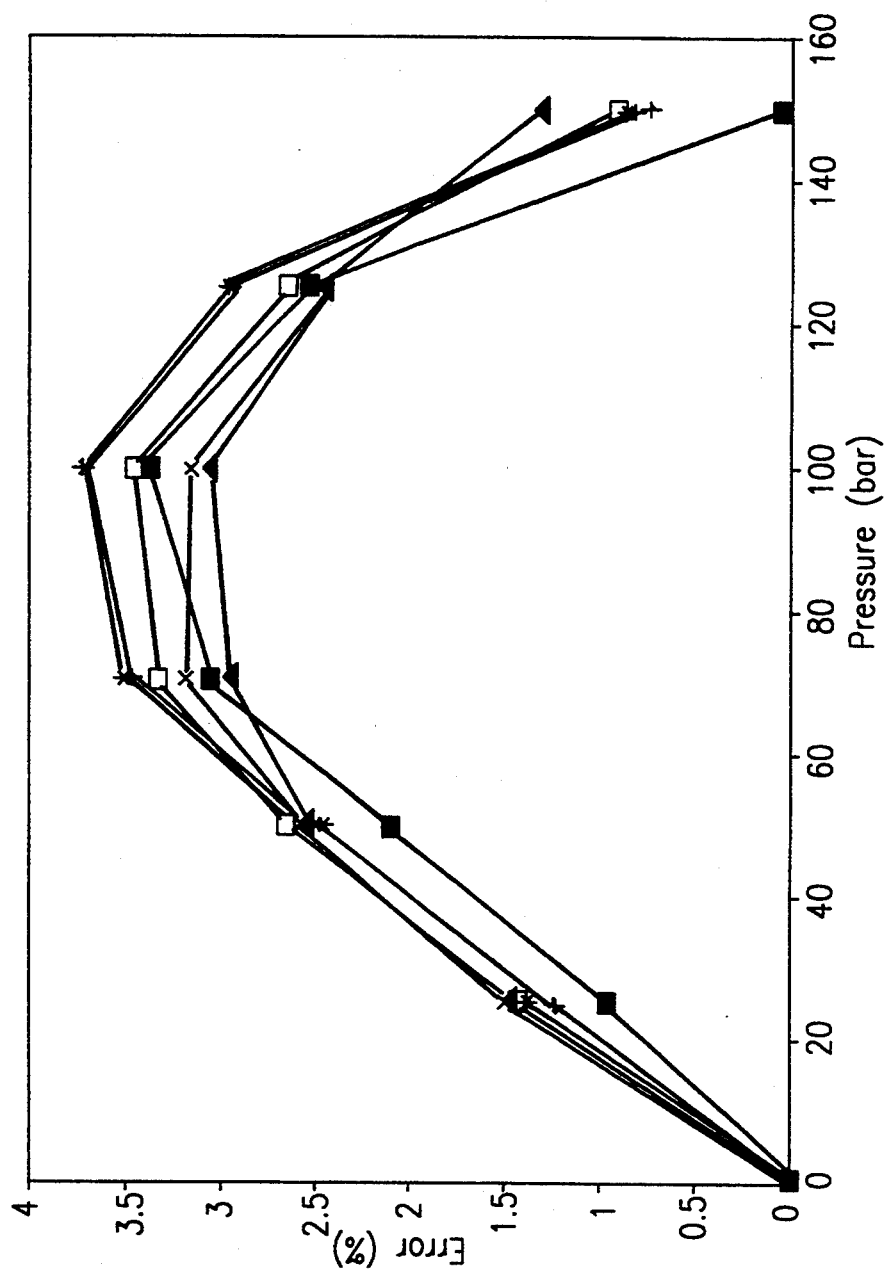
FIG. 4 depicts a set of curves showing an error factor between the van der Waals curves for oxygen and the output of the apparatus of the invention.

FIG. 3 & FIG. 4 provide illustrative results for the apparatus of the invention. The circuit parameters were chosen to replicate the van der Waals curves for oxygen, as depicted in FIG. 2. Specifically, the critical parameters were:

| | | | |
|---|---|---|---|
| $RT1_0$ | = 1.25 kΩ | $R7$ | = 1.75 kΩ |
| $RT2_0$ | = 7 kΩ | $V_{REF}$ | = 5.85 V |
| $\alpha_1$ | = 0.44%/°C. | $\alpha_2$ | = 0.198%/°C. |

As will be seen in the curves of FIG. 3, the voltage output of the invention, $V_{OUT}$, plotted against pressure, tracks very closely the van der Waals output of No. of Moles of Gas versus pressure of FIG. 2—a scale of 1 V/mole being used. FIG. 4 then shows the actual error between the $V_{OUT}$ curves at various temperatures versus the corresponding van der Waals curves for moles of gas, plotted against pressure. As can be seen, the experienced error ranged from 0 to less than 4 percent, thereby demonstrating that the apparatus of the invention provides very accurate information as to the mass of the gas being monitored.

Herein, an improved leak detection apparatus based on the principle of the van der Waals equation for behavior of a gas in a container has been disclosed. Although the present embodiment of the invention has been described in detail, it should be understood that various changes, alterations and substitutions can be made therein without departing from the spirit and scope of the invention as defined by the appended claims.

What is claimed is:

1. An apparatus for detecting a leak in a closed gas containing vessel of a given volume, comprising:
    a pressure transducer, having a member operable to change from a first position to a second position in response to a change in pressure of a gas applied to the surface thereof, said member being disposed relative to said vessel so as to place said surface in contact with a gas contained in said vessel, and having a means for converting said position changes into an electrical signal proportional to the magnitude of said position changes;
    amplifying means operating on said electrical signal so as to produce, at an output thereof, an output signal characterized in being inversely proportional to changes in temperature of said gas, thereby causing said output signal to be independent of temperature induced changes in pressure for said gas; and
    means for compensating said output signal for deviations from a perfect model in said gas pressure changes, wherein said means for compensating said output signal comprises a feedback circuit operative to inject a portion of said output signal to said electrical signal produced by said pressure transducer, thereby providing at said output a signal directly proportional to actual temperature-independent pressure changes, said actual pressure changes being indicative of a reduction in mass of said gas and thereby indicative of a leak from a sealed vessel.

2. The leak detection apparatus of claim 1 wherein said member of said pressure transducer comprises a deflectable membrane and said means for converting comprises at least one pressure responsive resistance element disposed in such a manner as to be responsive to deflection of said membrane and whereupon an electrical potential applied relative to said pressure responsive resistance element will be caused to vary in proportion to said membrane movement, thereby constituting said electrical signal.

3. The leak detection apparatus of claim 2 wherein said pressure responsive resistance element constitutes an element of a Wheatstone bridge array, said electrical potential is applied across a first and second terminal of said array and said electrical signal is derived from a third and fourth terminal of said array.

4. The leak detection apparatus of claim 1 wherein said amplifying means comprises an operational amplifier having a gain of 1/T, where T is a temperature of said gas.

5. The leak detection apparatus of claim 4 wherein said 1/T gain is implemented by disposition of a feedback circuit from an output of said operational amplifier to an input thereof containing a resistive element having a resistance value which varies with temperature.

6. The leak detection apparatus of claim 4 wherein said operational amplifier is implemented as a differential amplifier operating on a difference signal from said pressure transducer.

7. The leak detection apparatus of claim 6 further including a conversion means disposed at an output of said differential amplifier for converting a differential output thereof to a single ended output, said single ended output being coupled to said output of said amplifying means.

8. The leak detection apparatus of claim 1, wherein said feedback circuit contains an operational amplifier.

9. The leak detection apparatus of claim 1, wherein said feedback circuit contains a means for causing said injected portion of said output signal to be varied in inverse proportion to changes in temperature of said gas in said vessel.

10. The leak detection apparatus of claim 9 wherein said inverse temperature variation means incorporates a resistive element having a resistance value which varies with temperature.

11. The leak detection apparatus of claim 10 wherein said temperature varying resistive element is implemented as an element of a voltage division circuit.

12. In an apparatus for detecting a leak in a closed gas containing vessel of a given volume, including a pressure transducer operable to convert changes in pressure of a gas contained in said vessel into an electrical signal proportional to said pressure changes and an amplifying means operable to produce an output signal characterized in being inversely proportional to changes in temperature of said gas, thereby causing said output signal to be independent of temperature induced changes in pressure for said gas, in combination therewith, the improvement comprising:
    means for compensating said output signal for deviations from a perfect model in said gas pressure changes, wherein said means for compensating comprises a feedback circuit operative to inject a portion of said output signal to said electrical signal produced by said pressure transducer, thereby providing at said output a signal directly proportional to actual temperature-independent pressure changes, said actual pressure changes being indicative of a reduction in mass of said gas and thereby indicative of a leak for a sealed vessel.

13. The leak detection apparatus of claim 12, wherein said feedback circuit contains an operational amplifier.

14. The leak detection apparatus of claim 12, wherein said feedback circuit contains a means for causing said injected portion of said output signal to be varied in inverse proportion to changes in temperature of said gas in said vessel.

15. The leak detection apparatus of claim 14 wherein said inverse temperature variation means incorporates a resistive element having a resistance value which varies with temperature.

16. The leak detection apparatus of claim 15 wherein said temperature varying resistive element is implemented as an element of a voltage division circuit.

17. The leak detection apparatus of claim 12 wherein said amplifying means comprises an operational amplifier having a gain of $1/T$, where T is a temperature of said gas.

18. The leak detection apparatus of claim 17 wherein said $1/T$ gain is implemented by disposition of a feedback circuit from an output of said operational amplifier to an input thereof containing a resistive element having a resistance value which varies with temperature.

19. The leak detection apparatus of claim 17 wherein said operational amplifier is implemented as a differential amplifier operating on a difference signal from said pressure transducer.

20. The leak detection apparatus of claim 19 further including a conversion means disposed at an output of said differential amplifier for converting a differential output thereof to a single ended output, said single ended output being coupled to said output of said amplifying means.

* * * * *